(12) United States Patent
Baldwin

(10) Patent No.: US 7,743,048 B2
(45) Date of Patent: Jun. 22, 2010

(54) SYSTEM AND METHOD FOR PROVIDING A GEOGRAPHIC SEARCH FUNCTION

(75) Inventor: Laura J. Baldwin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 566 days.

(21) Appl. No.: 11/083,999

(22) Filed: Mar. 21, 2005

(65) Prior Publication Data

US 2006/0106778 A1    May 18, 2006

Related U.S. Application Data

(60) Provisional application No. 60/623,519, filed on Oct. 29, 2004.

(51) Int. Cl.
*G06F 7/00* (2006.01)
(52) U.S. Cl. .................. 707/713; 709/724; 709/736
(58) Field of Classification Search .................. 707/3, 707/5, 713, 709, 724, 736
See application file for complete search history.

(56) References Cited

U.S. PATENT DOCUMENTS

| | | | |
|---|---|---|---|
| 6,202,065 B1 | 3/2001 | Wills | |
| 6,577,946 B2 * | 6/2003 | Myr | 701/117 |
| 6,587,787 B1 * | 7/2003 | Yokota | 701/212 |
| 6,701,307 B2 * | 3/2004 | Himmelstein et al. | 707/3 |
| 2001/0011270 A1 | 8/2001 | Himmelstein et al. | |
| 2002/0052786 A1 * | 5/2002 | Kim et al. | 705/14 |
| 2002/0156779 A1 | 10/2002 | Elliott et al. | |
| 2002/0156917 A1 * | 10/2002 | Nye | 709/238 |
| 2005/0131866 A1 * | 6/2005 | Badros et al. | 707/3 |

FOREIGN PATENT DOCUMENTS

WO     WO 00/41090     7/2000

OTHER PUBLICATIONS

EP Search Report dated Apr. 13, 2006 for corresponding European Appl. No. 05109687.3.

* cited by examiner

*Primary Examiner*—Etienne P LeRoux
*Assistant Examiner*—Bruce A Witzenburg
(74) *Attorney, Agent, or Firm*—Shook, Hardy & Bacon L.L.P.

(57) ABSTRACT

A system and method are provided for implementing a geographic search mode in connection with a search engine. The method may include indexing geographic locations for resources available to the search engine in a search engine index. The method may additionally include determining a target location for a particular user upon receiving a user query from the particular user and searching the search engine index for geographic location matches matching the target location.

20 Claims, 6 Drawing Sheets

SYSTEM AND METHOD FOR PROVIDING A GEOGRAPHIC SEARCH FUNCTION

CROSS-REFERENCE TO RELATED APPLICATIONS

This application claims priority to provisional application 60/623,519, filed Oct. 29, 2004.

STATEMENT REGARDING FEDERALLY SPONSORED RESEARCH OR DEVELOPMENT

None.

TECHNICAL FIELD

Embodiments of the present invention relate to a system and method for incorporating a geographic search function in a search engine and in particular to a system and method for searching in the geographic vicinity or in accordance with a geographic preference of a computer user issuing a query.

BACKGROUND OF THE INVENTION

Through the Internet and other networks, users have gained access to large amounts of information distributed over a large number of computers. In order to access the vast amounts of information, users typically implement a user browser to access a search engine. The search engine responds to an input user query by returning one or more sources of information available over the Internet or other network.

In operation, the search engine typically implements a crawler to access a plurality of information sources and stores references to those information sources in an index. The references in the index may be categorized based on one or more keywords.

Often, users may want to search for resources such as businesses that are located in a specific geographic area. For instance, a user may want to locate a service near the user's home of office. In another example, a user may be searching for restaurants in a city that the user expects to visit.

Currently, when a user wants a search to be geographically focused, the user may access online yellow pages that provide names and phone numbers of businesses within the selected geographic area. Similar services include business locator services such as local services provided through Google or Yahoo. Alternatively, the user may insert the name of a geographic area in the user query. Problems arise using both of these traditional approaches. The online yellow pages resource often fails to provide sufficient information about the businesses. While the yellow pages may provide a business address and phone number, the user is forced to call the business to obtain information regarding services or fees as limited information is typically available through the yellow pages. The second approach, in which a user inserts a geographic area in the query string, will often cause incomplete and inaccurate results to be produced. Many potential results in the searched area may be omitted based on the keyword search and other results may be erroneously included as a result of the keyword search.

Accordingly, a solution is needed for providing a geographic online search tool that matches geographic locations rather than simply words from a user input query. Furthermore, a solution is needed that will provide results including more complete and accurate information in response to a user query.

BRIEF SUMMARY OF THE INVENTION

Embodiments of the present invention include a method for implementing a geographic search mode in connection with a search engine. The method may include indexing geographic locations for resources available to the search engine in a search engine index and determining a target location for a particular user upon receiving a user query from the particular user. The method may additionally include searching the search engine index for geographic location matches matching the target location.

In additional aspects, a geographic search system is provided for allowing a user to generate search results relevant to a target location. The system may include a geo-entity extractor for operating in conjunction with a crawler to crawl available information sources and extract location information and a geo-tagger for tagging and indexing information sources with extracted location information. The system may additionally include location determination components for determining a target location upon receiving a user query and location matching components for matching the target location with indexed locations and generating results based on located matches.

In yet a further aspect, a user interface system may be provided for implementing geographic search tools that search an index for geographic location matches. The user interface system may include a user-selectable local area option that prompts the geographic search tools to determine a user local area and search for indexed results in the determined local user area and a user-selectable alternative location option that allows a user to select an alternative location that prompts the geographic search tools to search for indexed results corresponding to the alternative location.

BRIEF DESCRIPTION OF THE DRAWINGS

The present invention is described in detail below with reference to the attached drawings figures, wherein:

FIG. 7 is a screen shot illustrating a settings page in accordance with an embodiment of the invention.

DETAILED DESCRIPTION OF THE INVENTION

I. System Overview

Figure 1:
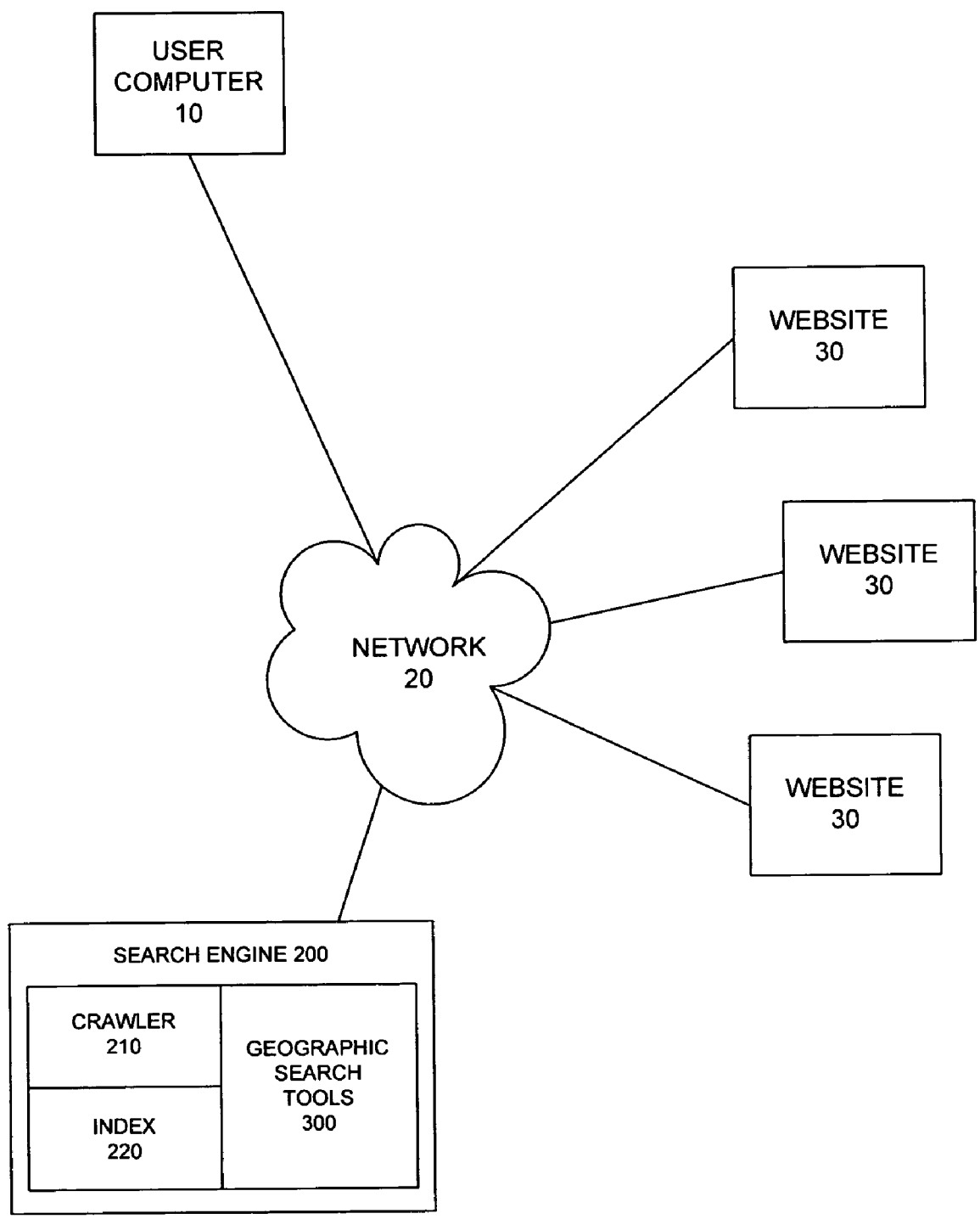
FIG. 1 is a block diagram illustrating an overview of a system in accordance with an embodiment of the invention.

A system and method are provided for implementing a search function for matching user preferred geographic locations with indexed locations in addition to matching indexed words with the words of a user-entered query. The search function may match a user's selected or default geographic location with an indexed geographic location related to each indexed source available over a network.

The system may include a plurality of user computers 10 connected over a network 20 with a search engine 200. The search engine 200 may respond to a user query by searching a plurality of information sources such as web sites 30. The search engine 200 may include an index 220, a crawler 210 for building the index 220, and geographic search tools 300. The index 220 may include information for indexing the web sites 30 including geographic information related to each website as determined by the geographic search tools 300. The geographic search tools 300 may aid the crawler 210 in indexing the geographic information in the index 220. Thereafter, the geographic search tools 300 may supplement the customary search tools in order to determine a user location upon entry of a user query or process a selected user location and match the user location with information in the index 220. The search engine 200 may include additional known components, omitted for simplicity.

II. Exemplary Operating Environment

Figure 2:
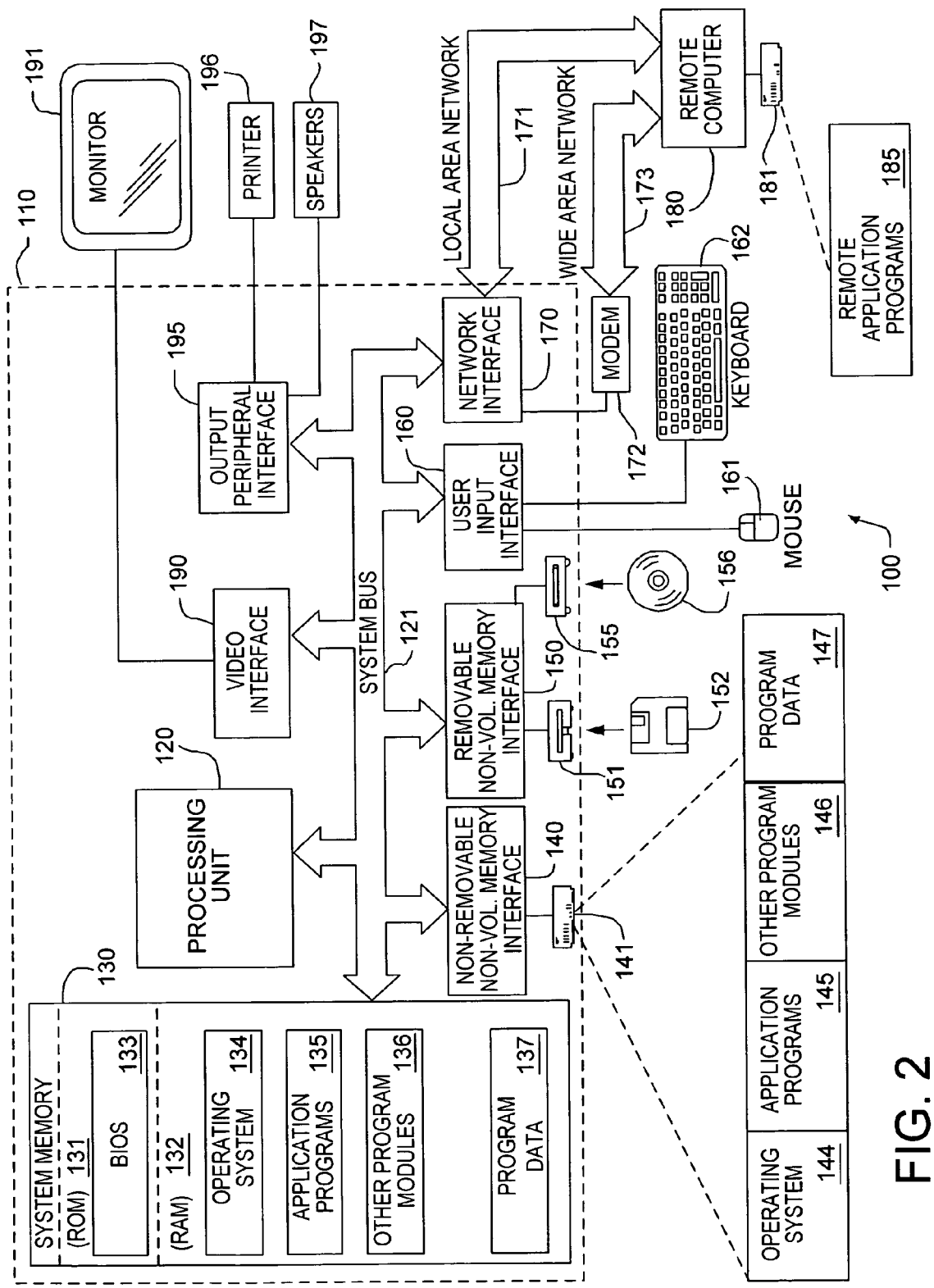
FIG. 2 is block diagram illustrating a computerized environment in which embodiments of the invention may be implemented.

FIG. 2 illustrates an example of a suitable computing system environment 100 on which the system for providing geographic searching may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIG. 1 illustrates a system for providing query assistance in accordance with an embodiment of the invention. The system may include user computers 10 connected over the network 20 with the search engine 200. As described above with respect to FIG. 2, the network 20 may be one of any number of different types of networks such as the Internet.

As set forth above, the search engine 200 may search the index 220 upon receiving a user query. The crawler 210 may build the index 220 by traversing the web sites 30 and indexing both keywords and geographic locations pertaining to the traversed web sites 30. The search engine 200 may respond to a user query by matching terms in the user query with terms in the index 220 and also by implementing the geographic search tools 300 to match a user location with terms in the index 220.

Figure 3:
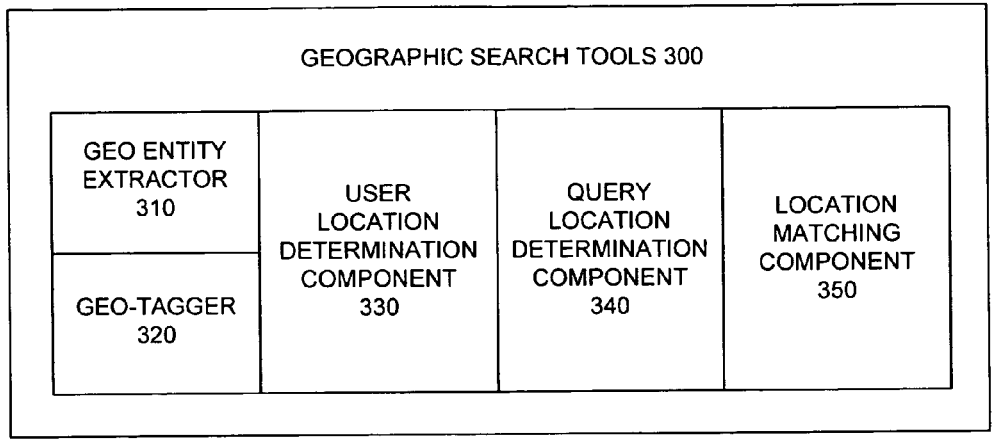
FIG. 3 is a block diagram illustrating geographic search tools in accordance with an embodiment of the invention.

FIG. 3 is a block diagram illustrating geographic search tools 300 in accordance with an embodiment of the invention. The geographic search tools 300 may include a geo-entity extractor 310, a geo-tagger 320, a user location determination component 330, a query location determination component 340, and a location matching component 350.

The geo-entity extractor 310 and the geo-tagger 320 may operate in conjunction with the crawler 210 and the index 220 to index location information from traversed web sites 30. The geo-entity extractor 310 extracts locations from the traversed web sites 30 as the crawler 210 traverses the web sites 30. These locations may include references made to geographic locations within a document or web site and do not refer to the physical location of the web site itself. For instance, the geo-entity extractor 310 may be applied to a news story to determine that the story is about an arsonist in Seattle even if the story is published by the Chicago Tribune.

The geo-tagger 320 may append location tags related to these web sites 30 for storage within the index 220. The geo-tagger 320 may use a simple pattern-matching algorithm to parse out and tag geographic entities during crawling and ultimately append a geo-tag to documents that have high-confidence geographic matches. The geo-tag may include encoded location information. In embodiments of the invention, this encoded location information may include a latitude-longitude centroid pinpoint. The geo-tags may be implemented as plain text and may be composed of a set of location codes. In embodiments of the invention, each geo-tag consumes only a few bytes of space. Therefore, each document may have several different tags if valid matches are made for distinct locations. In embodiments of the invention, very strict pattern matches may be required in order to avoid false positive matches. For example, the geo-extractor 310 and geo-tagger 320 may require, city, state or city, state and ZIP code patterns, rather than a mere zip code match, since a zip code may match other numbers conveying other types of information.

In addition to the heuristics or criteria for matching, the actual values of known locations e.g., list of all postal codes and associated cities or states, may be determined. This data may be provided by an existing online mapping service. Thus, the geo-tagger 320 may be expanded to recognize new types of places, and can propagate the index 220 with the associated new tags.

The user location determination component 330 may automatically determine a user location or alternatively may accept an input user-selected location. For instance, in order to determine an actual user location, the user location determination component 330 may attempt to ascertain a user's physical location by automatically determining a reverse IP address. As yet a further determinant, the user location determination component 330 may utilize a market culture location, such as a country or/region domain that is inherent in the host domain of the search site being used (e.g., search.msn.co.uk has the location "UK" as an assumption that affects the site's rank tuning).

Alternatively, the user location determination component 330 may operate based on a physical location specified by the user operating the user computer 10. The user location determination component 330 may provide a user interface tool that allows the user to select a city or enter a city. In embodiments of the invention, the geographic location tools 300 operate based on reverse IP address as a default. User selection of an alternative location may override this default setting.

The query location determination component 340 may parse geographic locations from the user's input query string (e.g., "Seattle Hotels"). While the query string is often irrelevant to the user's actual location, it may limit the information sought to a given location. In operation, at query time, the query location determination component 340 parses the query string for geographic location matches. For example, if a user types in "Hotels Redmond Wash.", the query location determination component 340 may extract "Redmond, Wash." from the query string and the relevant "location" for the query becomes "Hotels"+"near Redmond, Wash.".

As another example, if a user types in a query "college boston", the query location determination component 340 may find a geographic location match, which in this case, is the word "Boston". This location match may trigger a "search near this place" suggestion in the footer as shown and further described below with relation to FIG. 5. On the regular results page, the result set will be the product of lexical matches from the words "college" AND "Boston". If the user takes the "search near this place" suggestion by clicking on the suggestion hyperlink, the place name is extracted from the query and added as a geographical value instead. Thus, the query becomes "college" and the advanced operator is "near Boston".

Limits for location extraction from the query string may set in a number of ways. For example, limits may be set based on cities that are near the user's location, such as those locations falling within a one hundred mile radius of the user tile. As another example, limits may be based on the presence of a metropolitan city having a population of more than 100,000 people. These limits help to avoid over-parsing of locations.

With these limits, if the user types a query that contains a place name that falls within the one hundred mile radius range of the user's default location, the geographic search tools 300, using the query location determination component 340 may make a "search near this place" that allows the user to execute this option. The query location determination component 340 may provide a user interface with a "search near this place" suggestion if a user query includes a metropolitan city of a population of 100,000 or more in the query. This rule may add about 250 cities as likely location hits. Thus, when the query location determination component 340 identifies either a "city near me" or metropolitan city match from the user's query, a "search near this place" suggestion may be displayed on the results page.

The location matching component 350 performs the actual matching of indexed sites that correspond to keyword results with information extracted by the user location determination component 330 and the query location determination component 340. Thus, if a user selects the geographic location matching feature, the user will obtain personalized results. For example, a user in Oregon will get different results from a user in Florida and both users will receive different results from the mass-optimized results. The geographic location matching component 350 is effective in searching abstract nouns that change significance when a geographic reference is added (e.g., "food bank" "college" "opera" "theater" "baseball" become different when they are "food bank+near Seattle" ordered by proximity rather than by word match. Furthermore, the geographic location matching component 350 matches locations even when no location is present in a user query. For example, the geographic location matching component 350 can locate "high schools" near Seattle but can also find documents containing "high schools" near Seattle that don't necessarily contain the word "Seattle." For example, it can also pull in "high school" matches for Redmond, Bellevue, Shoreline, or other cities in the vicinity of Seattle, based on location match rather than lexical match.

In a default mode, a user interface may be provided for allowing a user the option to implement the geographic search tools 300. If the user has selected to implement the geographic search tools and has not entered any specific location options, the user location determination component 330 may automatically use a reverse IP address to determine the user's location. An alternative user selection may cause a different location to be searched.

Figure 4:
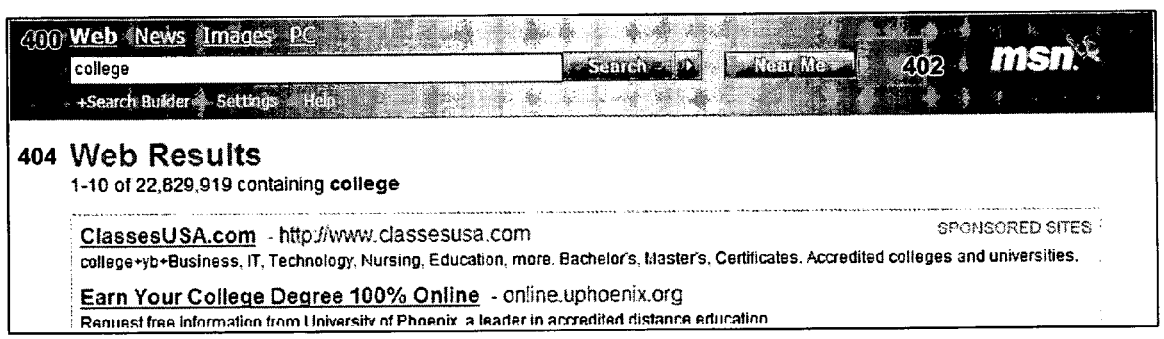
FIG. 4 is a screen shot illustrating a user interface presenting a geographic search option in accordance with an alternative embodiment of the invention.

FIG. 4 is a screen shot illustrating a user interface 400 including standard web results that offers a geographic search option. The user interface 400 includes a "near me" option 402 that allows a user to implement the geographic search tools 300 and a results section 404, which includes a standard page title. In the displayed example, when a user enters a search for "college" on the regular search page, the results are weighted according to standard search engine ranking procedures and any other parameters dictated by the user or the market settings. Whenever the user hits the "search button", the "Near Me" option 402 may be available as shown in the button to the right of the standard button.

Thus, with the user interface shown in FIG. 4, if the user has changed no settings and hits the "search near me" button, the system will use the assumed location, which will be displayed in the header of the page. The system may determine the reverse IP location each time there is no location value available in the user's cookie.

Figure 5:
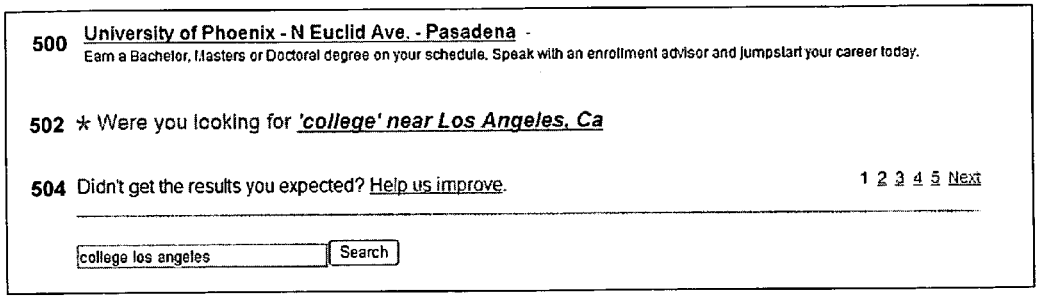
FIG. 5 is a screen shot illustrating a geographic search suggestion in accordance with an embodiment of the invention.

FIG. 5 is a screen shot illustrating a geographic search suggestion in accordance with an embodiment of the invention. A user interface 500 displaying the search suggestion may be provided as a footer to the user interface 400 shown in FIG. 4. The user interface 500 includes a search suggestion 502. A feedback option 504 may also be provided.

If the user enters a query on the standard web page interface 400 and the query location determination component 340 finds a location match, the search suggestion 502 may be provided allowing the user to elect to search near the location match within the query. For instance, if the user query of FIG. 4 had contained the phrase "Los Angeles College", the query location determination component may provide the suggestion 502 so that the user may implement location matching.

As shown in FIG. 5, selecting to search near the location match by clicking on the "'college' near Los Angeles, Calif." suggestion will reissue the user's existing query as a Search Near query as: query+near=[this Place] where the "[this place]" includes of a latitude/longitude value used for matching the geotagged tiles and the Display Name "Los Angeles". By adding "Near" data to the URL, the location matching component 350 is implemented and the "search near me" page is served as a result.

Figure 6:
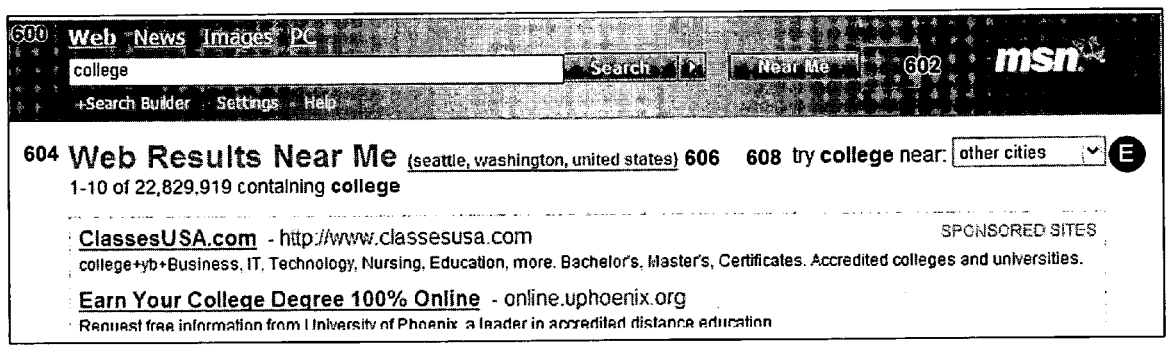
FIG. 6 is a screen shot illustrating a results interface in accordance with an embodiment of the invention.

FIG. 6 is a screen shot illustrating the "search near me" page and results generated when the geographic search tools 300 are implemented as described above. A user interface 600 includes a "search near me" option 602, a geographic search title page 604, a user location 606, and popular city suggestions 608. In embodiments of the invention, the cities may appear in a drop-down menu of selectable cities in order to allow a user to rapidly query alternative locations. For example, the dropdown list may contain twenty five popular cities, displayed in alphabetical order by city name. The cities may be determined by an intersection between popular travel or cultural destinations and population. This feature allows users to quickly override the "Near Me" default location with a popular city value. As illustrated, the uppermost value in the dropdown list 608 may be "other cities".

When a user selects a popular city from the dropdown list, the existing query may be reissued with the new location by latitude and longitude as the value for Near=[thisPlace]. Once a popular city is selected, the user is no longer in "search near me" mode but is now in "search near this place" mode. The dropdown box may reset after the new results are rendered and may once again show "other cities" as the value selected. Thus, a user may get into a "search near this place" mode either by clicking on a "search near this place" suggestion, or by selecting a popular city from the dropdown list provided on the settings page. The "search near this place" mode is a secondary mode that allows the user to look for items near a city that is not his/her default location. The user is able to use the functionality of this page to look for things near other cities without having to change his/her own location to get results for a different city.

The user may reach the interface 600 by clicking the "Near Me" button 402 from FIG. 4 above. Results 604 on the interface 600 take geographic location into consideration. In the displayed example, the query "college" is searched in conjunction with the operation of the user location determination component 330, which has determined the user's location either through reverse IP address or through a user setting. In the displayed example, Seattle Washington is shown as the default location value 606.

When the user is in "search near me" mode, the system implements the user location determination components 330 to determine a default location. If the user has not explicitly set a location on the settings page, the user location determination component implements reverse IP detection to determine a location. If the user has explicitly set a location, this value is read from the settings cookie and reverse IP is not used. As set forth above, the default location value 606 for "Near Me" is shown to the right of the Search near me page title 604. The default location may be linked to a settings page shown in FIG. 7 where the user may configure the default location value.

Figure 7:
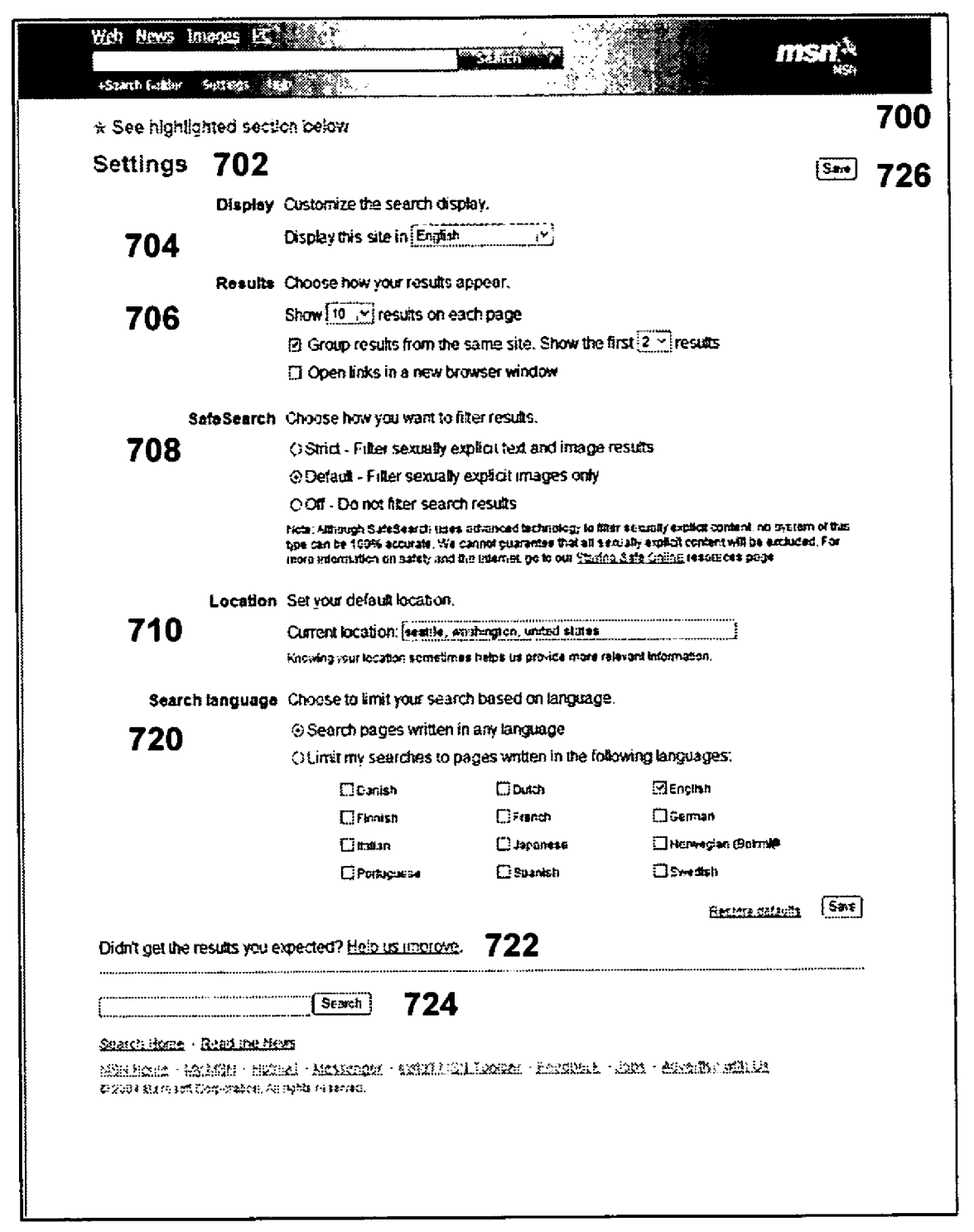

FIG. 7 is a screen shot illustrating a settings page 700 in accordance with an embodiment of the invention. The settings page 700 may appear when the user selects the "search near me" option. The settings page 700 may include a heading 702, a display section 704, a results section 706, a safe search section 708, a location section 710, and a search language section 720. The settings page 700 may also include a feedback option 722, a search box 724, and a save settings option 726.

On the settings page, the user may define a geographic location in the location section 710. If a user explicitly sets a geographic location on this page, the user location determination component 330 may write this value into the user's settings cookie so that the set location becomes the definitive physical location for that user. In embodiments of the invention, this selection overrides the automatic reverse IP determination. The user's location may be displayed in the page title as shown and described above with respect to FIG. 6 and may be linked to the settings page. The interface may allow the user to click on the location in order to take the user to the settings page where the default location may be changed.

Figure 8:
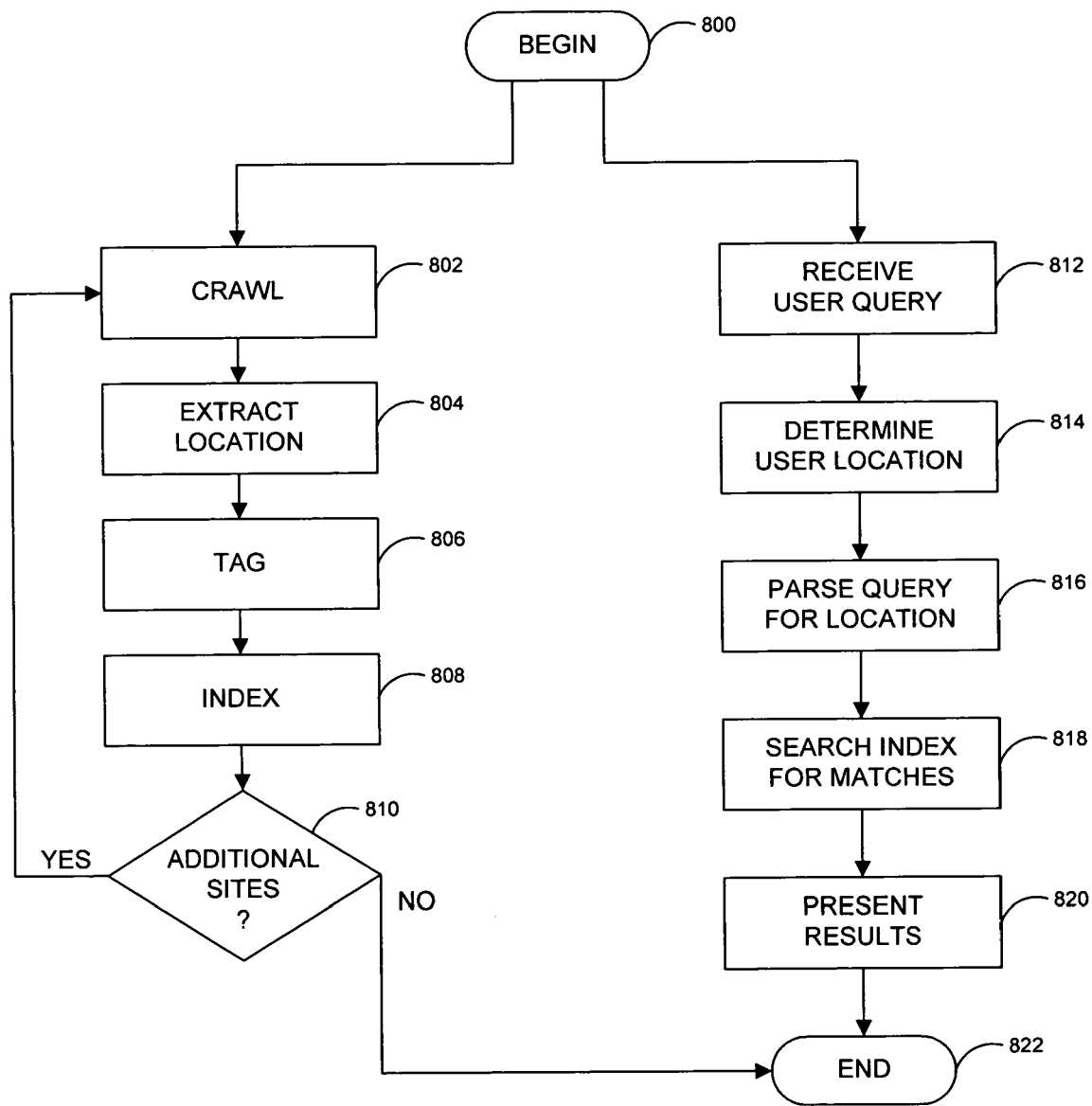
FIG. 8 is a flow chart illustrating a method for implementing the geographic search tools in accordance with an embodiment of the invention.

FIG. 8 is a flow chart illustrating operation of geographic search tools in accordance with embodiments of the invention. The process begins in step 800. As set forth above, the crawler 210 may crawl through available web sites 30 at regular intervals as exemplified at step 802. In step 804, the geographic search tools 300 implement the geo-entity extractor 310 to extract location information from the traversed site 30. In step 806, the geographic search tools 300 implement the geo-tagger 320 to tag the traversed site 30 and in step 808, the geographic search tools 300 index the information. This process repeats if additional sites are available in step 810.

Intermittently, the system may receive a user query in step 812 while in geographic search mode, including the "search near me" mode and the "search near this place" mode. If the user is in geographic search mode, in step 814, the geographic search tools 300 may determine a user-selected or user default location. In step 816, the geographic search tools 300 may parse the input query for location information. If a location is found, the geographic search tools 300 may present a "search near this place" option. In step 818, the search engine 200 may search the index 220 for location matches based on the user-selected or user default location. In step 820, the search engine 200 may present results. The process ends at 822.

The flow illustrated in FIG. 8 is merely exemplary as the system operation depends to a large degree on user input. User actions during a search, such as user selection of a suggestion, will change the order of operations of the geographic search tools 300.

As set forth above, the geographic search tools 300 may perform matching using a variety of techniques including implicit techniques such as entity extraction from user's query, history, real-time data mining and collaborative filtering, browse patterns, etc. as well as explicit techniques, such as specifying location. Each query executed in geographic search mode including the "search near me" mode and the "search near this place" modes may take location into consideration, either from a location explicitly specified in the query string or popular city drop-down list, or from an implicit consideration of the user's geographic location. There may be different types of "location" with different types of rules of which the system is aware. Through the use of the "sear near me" and "search near this place" options, the interface provides the user with the ability to transfer from a general search to a geographic search with one click.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method for implementing a geographic search mode in connection with a search engine, the method comprising:
    indexing geographic locations for resources available to the search engine in a search engine index;
    determining a target location from one or more keywords in a query string submitted by a user to a search engine;
    identifying the target location as a geographic city;
    determining two or more alternative location cities within a pre-defined geographic radius around the geographic city with at least a minimum population of people;
    suggesting that a user limit a search for at least one of the one or more keywords to the two or more alternative cities;
    presenting a drop-down menu with the two or more alternative location cities arranged in alphabetic order;
    receiving an indication, by the user, to limit the search for the at least one of the one or more keywords one of the two or more alternative cities;
    searching web content for information relevant to the at least one of the one or more keywords and limited to the one of the two or more alternative cities; and
    transmitting the information.

2. The method of claim 1, further comprising determining the target location by finding a reverse IP address of the particular user.

3. The method of claim 1, further comprising determining the target location by examining stored information pertaining to user settings.

4. The method of claim 3, further comprising determining the target location by finding a reverse IP address of the particular user if no stored target location information is present.

5. The method of claim 1, further comprising parsing a user query for location information.

6. The method of claim 5, further comprising providing a suggestion to the particular user to search in an area near the parsed location information.

7. The method of claim 1, further comprising implementing a geo-entity extractor for operating in conjunction with a crawler to crawl available information sources and extract location information.

8. The method of claim 7, further comprising implementing a geo-tagger for attaching a geo-tag to the available information sources and indexing the available information sources.

9. The method of claim 8, further comprising creating a geo-tag including a latitude-longitude centroid point.

10. The method of claim 9, further comprising attaching multiple geo-tags to at least one information source.

11. The method of claim 1, further comprising providing the particular user with a selectable drop-down list of cities so that the particular user may select a target location.

12. A geographic search system for allowing a user to generate search results relevant to a target location, the system comprising:
- a geo-entity extractor for operating in conjunction with a crawler to crawl available information sources and extract location information;
- a geo-tagger for:
  (1) tagging and indexing information sources with extracted location information~
  (2) appending a text indication indicative of a latitude-longitude centroid pinpoint to web documents that have been determined to have high-confidence geographic matches:
- one or more location determination components for determining a target location that is geographically located within a predetermined radius from a location identified in a query string submitted by a user to a search engine;
- determining a target location from one or more keywords in a query string submitted by a user to a search engine;
- identifying the target location as a geographic city; determining two or more alternative location cities within a pre-defined geographic radius around the geographic city with at least a minimum population of people;
- suggesting that a user limit a search for at least one of the one or more keywords to the two or more alternative cities;
- presenting a drop-down menu with the two or more alternative location cities arranged in alphabetic order,
- receiving an indication, by the user, to limit the search for the at least one of the one or more keywords one of the two or more alternative cities;
- searching web content for information relevant to the at least one of the one or more keywords and limited to the one of the two or more alternative cities; and transmitting the information.

13. The system of claim 12, wherein the location determination components include a user location determination component for finding a reverse IP address of a user inputting a query.

14. The system of claim 12, wherein the location determination components comprise a user location determination component for determining the target location by examining stored information pertaining to user settings.

15. The system of claim 12, wherein the location determination components further comprise a query location determination component for parsing a user query for location information.

16. The system of claim 15, further comprising a user interface for providing a suggestion to the user to search in an area near the parsed location information.

17. The system of claim 12, wherein the geo-entity tagger creates and appends a geo-tag including a latitude-longitude centroid point.

18. The system of claim 12, further comprising a user interface having a selectable drop-down list of cities so that the user may select the target location.

19. A user interface system for implementing geographic search tools that search an index for geographic location matches, the user interface system comprising:
- a user-selectable local area option that prompts the geographic search tools to determine a user local area and search for indexed results in the determined local user area, wherein the user local area is determined by an IP address associated with a client computing device;
- indexing geographic locations for resources available to the search engine in a search engine index;
- determining a target location from one or more keywords in a query string submitted by a user to a search engine;
- identifying the target location as a geographic city; determining two or more alternative location cities within a pre-defined geographic radius around the geographic city with at least a minimum population of people;
- suggesting that a user limit a search for at least one of the one or more keywords to the two or more alternative cities;
- presenting a drop-down menu with the two or more alternative location cities arranged in alphabetic order,
- receiving an indication, by the user, to limit the search for the at least one of the one or more keywords one of the two or more alternative cities;
- searching web content for information relevant to the at least one of the one or more keywords and limited to the one of the two or more alternative cities; and transmitting the information.

20. The user interface system of claim 19, further comprising a user selectable suggestion for a search location based on parsing of an input user query.

* * * * *